J. McBREAIRTY.
SPRING WHEEL.
APPLICATION FILED JAN. 14, 1918.
1,297,881.
Patented Mar. 18, 1919.
2 SHEETS—SHEET 2.
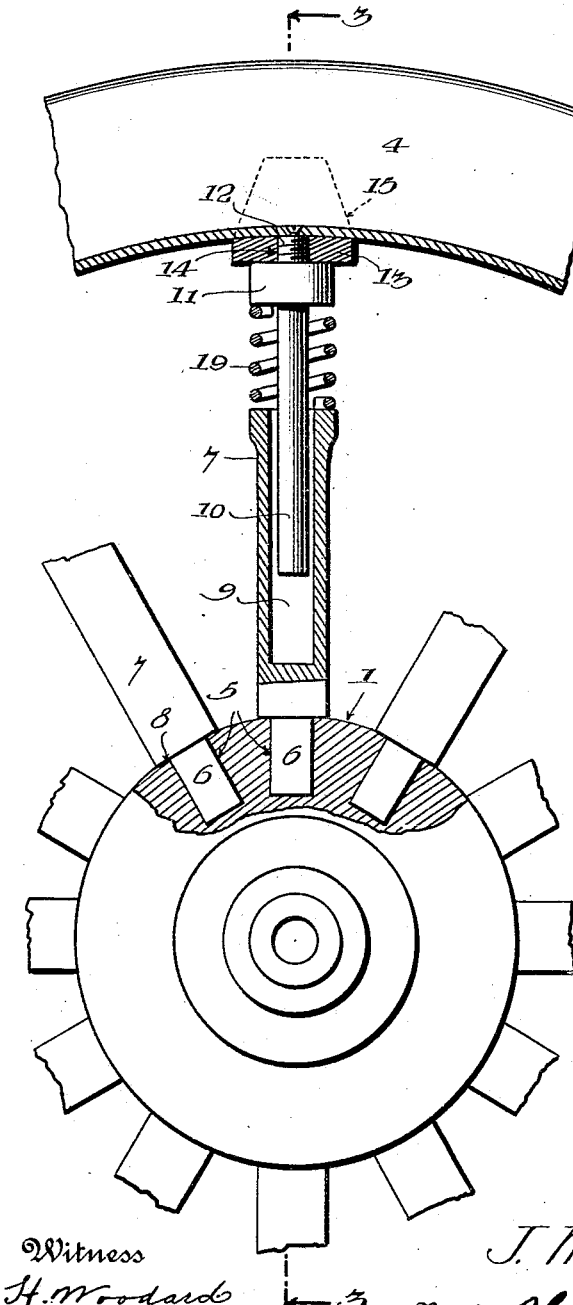
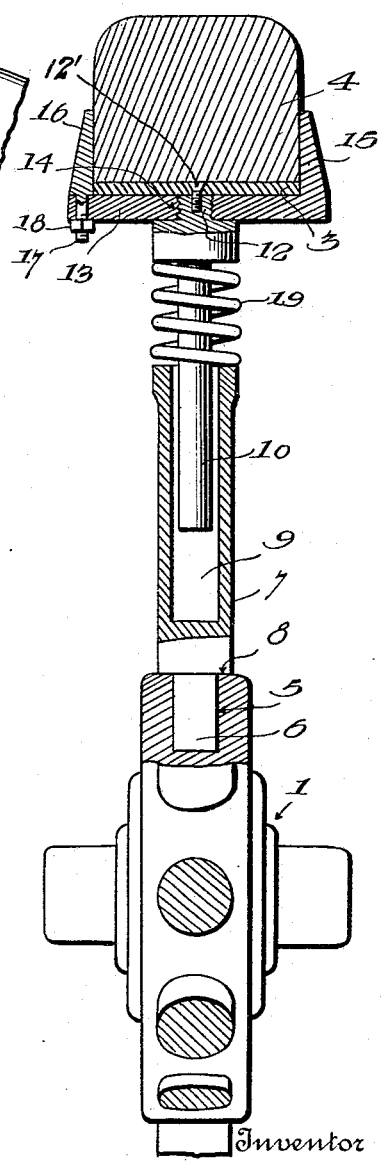

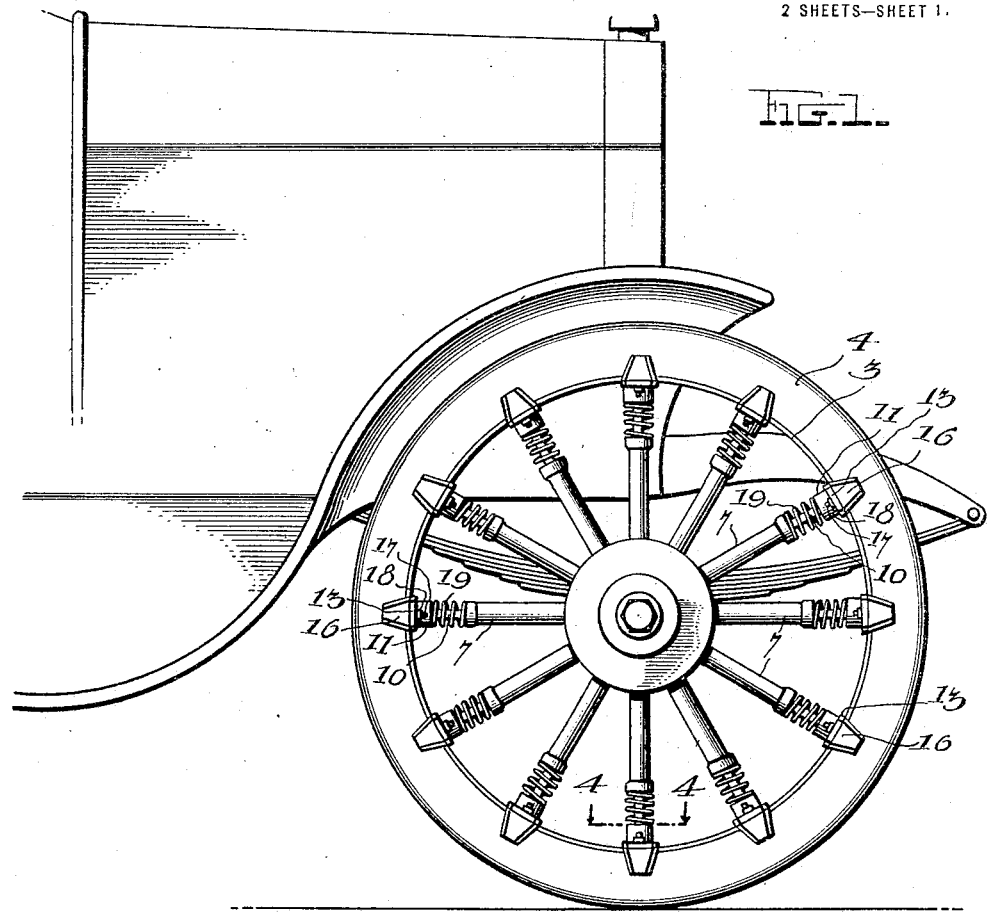
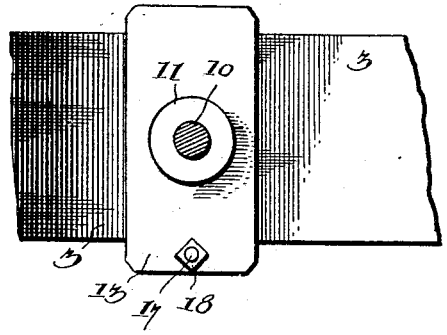
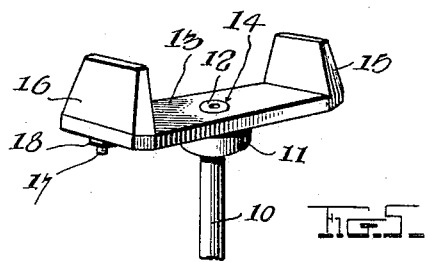

UNITED STATES PATENT OFFICE.

JOHN McBREAIRTY, OF DICKEY, MAINE.

SPRING-WHEEL.

1,297,881.

Specification of Letters Patent.   Patented Mar. 18, 1919.

Application filed January 14, 1918. Serial No. 211,875.

*To all whom it may concern:*

Be it known that I, JOHN MCBREAIRTY, a citizen of the United States, residing at Dickey, in the county of Aroostook and State of Maine, have invented certain new and useful Improvements in Spring-Wheels; and I do declare the following to be a full, clear, and exact description of the invention, such as will enable others skilled in the art to which it appertains to make and use the same.

This invention relates to improvements in spring wheels adapted for use on power driven vehicles such as automobiles, automobile trucks, and the like.

The primary object is to provide a resilient wheel without a pneumatic tire which will possess all of the advantages of a wheel with such a tire without the liability of collapse through punctures, blowouts and other accidents.

Another object is to provide a device of this character wherein the number of working or moving parts has been decreased and simplified and one which may be easily assembled.

With these and numerous other objects in view, my invention resides in the novel features of construction and the combination and arrangement of the several parts as illustrated in the accompanying drawings and more particularly pointed out in the specification and claims.

Referring to the drawings:—

Figure 1 represents a side elevation of my spring wheel applied to an automobile;

Fig. 2 is a side elevation of a portion of the wheel partly in section;

Fig. 3 is a vertical section on the line 3—3 of Fig. 2;

Fig. 4 is a horizontal section on the line 4—4 of Fig. 1; and

Fig. 5 is a detail perspective view of one of the forks.

In the present embodiment of my invention as illustrated in the accompanying drawings, the wheel is shown comprising broadly a hub provided with a plurality of radially extending spokes having mounted on their outer ends a spring metal rim or band on which is disposed a tread of rubber or the like.

In more specifically describing the structural details of the spring wheel, similar numerals of reference will be employed to indicate corresponding parts throughout the several views.

The hub 1 is provided in its periphery with a plurality of sockets 5 in which are rigidly secured the inner reduced ends 6 of the radially extending spoke elements 7, said reduced ends providing shoulders 8 which abut against the periphery of the hub. Longitudinally extending sockets 9 are provided in the outer ends of said spoke elements and are adapted for receiving and guiding the elements 10 radially as illustrated in Figs. 2 and 3 of the drawings.

Adjacent the outer ends of the spoke elements 10 are provided integral heads or collars 11 on whose outer faces are centrally disposed internally and externally threaded studs 12 for a purpose to be hereinafter set forth. Disposed transversely of the wheel rim are forks each comprising a main bar 13 provided with a centrally disposed threaded aperture 14 adapted to receive the stud 12, and the interior threads of each stud 12 engage with one of the screws 12′ which combines with the adjacent ears 15 and 16, to secure the adjacent bar 13 to the rim 3.

One end of the bar 13 is provided with an integral radially extending ear 15 and at its other end with a removable ear 16 which has a threaded stud 17 projecting through an aperture in said bar and retained therein by a nut 18 or the like and for a purpose to be hereinafter set forth.

Disposed between the outer end of each spoke element 7 and the adjacent head or collar 11 is a coil spring 19 surrounding the spoke element 10 whereby the forks are normally pushed outwardly under tension of said springs. Extending around the wheel and disposed against the forks is a continuous flat spring metal band or rim 3 which is secured in any manner to the bars 13 of the forks, and serves as a support for a tread member or tire 4 formed of rubber or any other suitable material, said tread member extending around the spring rim and disposed between the ears 15 and 16 and having its outer face disposed beyond that of the ears as shown in Fig. 1 of the drawings.

The wheel is adapted to be so mounted on the vehicle as to dispose the integral ears 15 adjacent the body of the vehicle so that in the event the tire or tread need be removed, the outer ears may be readily detached.

I claim:—

1. In a spring-wheel, the combination of a resilient spoke, a relatively thin and wide spring rim, a resilient tire on the rim and extending from side to side of the latter, a rim-supporting element on the outer end of said spoke, ears on said rim-supporting element, said ears extending radially beyond the junction of the rim and tire so as to hold the latter on the rim, and means coöperative with said ears and spoke for securing said rim in a fixed position on said rim-supporting element.

2. In a resilient wheel, a one-piece spring metal rim formed with apertures therethrough, a plurality of resiliently mounted spoke elements each having a screw-threaded aperture in its outer end, a plurality of collars each united with one of said spokes at a slight distance from the outer end of the latter, a plurality of rim-supporting bars each having a central aperture therethrough and having a radially extending ear united with one end and having an aperture through its other end, a plurality of ears each having a stud which normally extends through the apertured end of one of said bars and removably secures the last said ear thereto in a radial position, each of said bars receiving the outer end of one of said spoke elements and being seated on one of said collars, said rim being seated on said plurality of bars, a plurality of headed screws extending through the apertures of said rim and engaging the threaded apertures of said spoke elements and thus uniting the latter with said rim and rim supporting bars, and a tire on said rim, the said ears normally extending across the joint where the tire is seated on the rim.

In testimony whereof I have hereunto set my hand in the presence of two subscribing witnesses.

JOHN <sup>his</sup> X <sub>mark.</sub> McBREAIRTY.

Witnesses:
   GEORGE HENDERSON,
   LIZZIE A. HENDERSON.

Copies of this patent may be obtained for five cents each, by addressing the "Commissioner of Patents, Washington, D. C."